Nov. 21, 1950 — R. M. FRACCHIA — 2,530,456
COLLAR FOR HANGING FLOWER POTS
Filed June 21, 1949
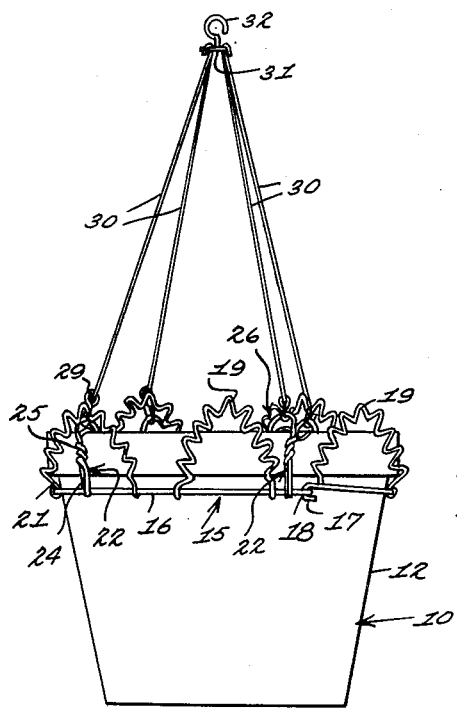
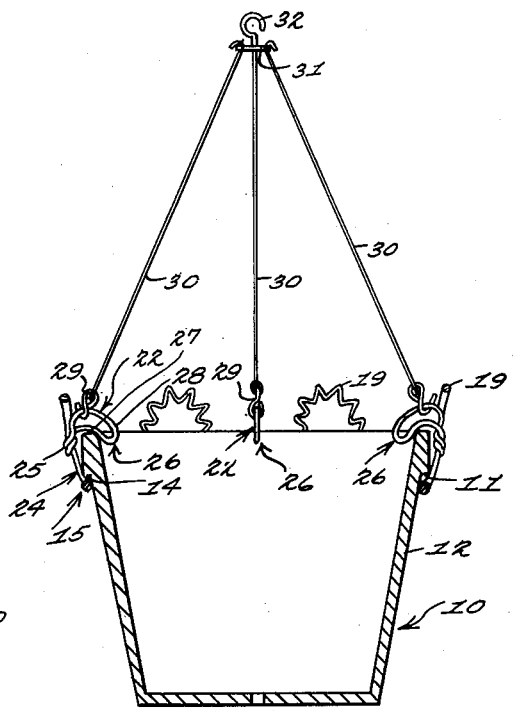
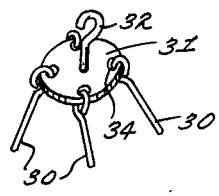
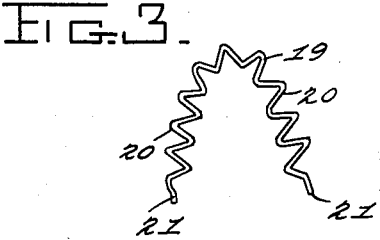
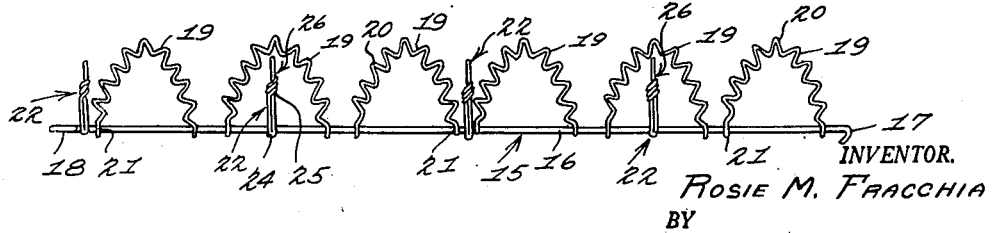
INVENTOR.
ROSIE M. FRACCHIA
BY
McMorrow, Berman & Davidson
ATTORNEYS Patented Nov. 21, 1950

2,530,456

UNITED STATES PATENT OFFICE 2,530,456

COLLAR FOR HANGING FLOWER POTS

Rosie M. Fracchia, Ukiah, Calif.

Application June 21, 1949, Serial No. 100,476

4 Claims. (Cl. 248—318)

This invention relates to a hanging flower pot and more particularly to a decorative supporting collar for a flower pot and the like.

It is an object of this invention to provide a collar for a hanging flower pot of the kind to be more particularly described hereinafter particularly designed to make any standard terra-cotta flower pot a hanging pot. A collar is provided for engagement below the rim of the flower pot and is formed with a hook and eye at the respective ends thereof for engagement and disengagement about the flower pot.

Another object of this invention is to provide a device of this kind having wire scallops attached to the collar extending outwardly above the outer edge of the pot. The scallops protect and support the plant and contribute to the attractiveness of the hanging pot.

Still another object of this invention is to provide a collar of this kind having loops that hook over the upper rim of the pot to hold the collar in place. The loops which hook over the rim of the flower pot are also used to hook the collar to the suspension chains or links.

A further object of this invention is to provide a flower pot suspension device of this kind made of metal or other suitable material formed to provide for the economic fabrication thereof while providing an efficient and attractive device of this kind.

With the above and other objects in view, my invention consists in the arrangement, combination and details of construction disclosed in the drawings and specification and then more particularly pointed out in the appended claims.

In the drawings:

Figure 1 is a side elevation of a flower pot hanging device, constructed according to an embodiment of my invention.

Figure 2 is a transverse section taken through the flower pot and hanging device.

Figure 3 is a front elevation of one of the scallop members, removed from the assembly.

Figure 4 is a side elevation of the flower pot engaging collar, showing the collar in its extended position.

Figure 5 is a fragmentary perspective view, partly broken away, showing the engagement of the flower pot suspension members with a supporting device at the upper end thereof.

Referring to the drawings, the numeral 10 designates generally a conventional style of flower pot formed of terra-cotta or other suitable and conventional material, the flower pot 10 being formed with a circumferential rib 11 about the upper end thereof extending outwardly beyond the side edges of the side walls 12. The outward extension of the lower end of the rib 11 defines a ledge 14, facing downwardly from the upper end of the pot 10, under which the collar to be described hereinafter is adapted to be engaged for suspending the pot 10 from a fixed overhead support.

The supporting collar 15, constructed according to an embodiment of this invention is formed of an elongated length of wire 16 having a length to encircle the body of the pot 10 below the ledge 14 thereof. The wire 16 is formed at one end with a returned hook 17 and at the other end with a loop 18 within which the hook 17 is adapted to be releasably engaged. The loop 18 is positioned in a substantially horizontal plane while the hook 17 is formed in a vertical plane, perpendicular to the plane of the loop 18, so that the hook 17 may be releasably engaged in the loop 18 by slipping the point of the hook downwardly within the loop.

A plurality of escalloped decorative members 19 are fixed along the length of the wire 16, each of the loops 19 being formed of a short length of wire crimped along the length thereof to provide a plurality of waves or half loops 20, the entire loop 19 being generally semi-circular in configuration, having the ends 21 thereof formed for fixed engagement along the length of the wire 16.

A plurality of hooks 22 are fixed along the length of the wire 16 and extend upwardly therefrom, certain of the hooks 22 being secured on the wire 16 between the decorative loops 19 and others of the hooks 22 being fixed on the wire 16 intermediate the length of other of the loops.

Each of the hooks 22 is also formed of a short length of wire bent to the desired configuration and formed for releasable engagement with the wire 16 along the length thereof and for hooking engagement over the upper edge of the bead 11 on the flower pot 10. Each of the hooks 22 is formed of a length of wire doubled upon itself to define a lower end 24 which is adapted to be fixed along the length of the wire 16 by welding or other suitable secure and fixed fastening devices. The doubled length of wire which forms the hook 22 is extended upwardly above the upper side of the wire 16 and is twisted about to define a twisted shank portion 25. A looped bill 26 is continued upwardly from the twisted shank 25 and is bent over the upper edge of the pot 10, inwardly thereof. The looped bill 26 is defined by an arcuate downwardly and inwardly extending lower run of the wire 27 and an upper run 28 spaced above the lower run 27. The upper and lower runs 28 and 27 respectively are connected together at their forward and inner ends and the rear end of the loop 26 is continued rearwardly and downwardly into the shank 25.

The lower run of the bill 27 is adapted to be engaged over the upper edge of the flower pot 10 for holding the collar 15 in its position about the flower pot and the upper run 28 which, together with the lower run 27 defines the loop 26 is provided for engagement with a hook 29 at the lower end of a link or suspension member 30.

A horizontal plate 31 is formed with an upwardly extending hook 32 on the upper side thereof and is formed with a plurality of apertures 34 circumferentially spaced apart about the periphery thereof. The upper looped or hooked ends of the links or wires 30 are adapted to be engaged in the apertures 34 for suspending the flower pot 10 from the hook 32, which is adapted to be engaged with any suitable fixed support.

In the use and operation of the collar 15, described above, the collar is formed as a flat elongated member, clearly shown in Figure 4, prior to its installation about the body of the flower pot 10. For engaging the flower pot hanging collar 15 about the flower pot 10, the wire or base member 16 is bent about the flower pot, below the ledge 14 of the bead 11 and the hook 17 is engaged within the eye 18, as clearly shown in Figure 1 of the drawings. The lower run 27 of the bill 26 is engaged over the upper edge of the flower pot for supporting the wire 16 and collar 15 against slipping downwardly about the pot 10 when the pot is supported on the bottom or base portion thereof. For suspending the flower pot 10 from a fixed, overhead support, the suspending elements 30 are engaged below the upper run 28, of the bill 26, between the upper and lower runs of the bill and the hook 32 may be fixed to any suitable fixed supporting member, from which the flower pot 10 may be suspended. The escalloped wire members 19, engaging about the periphery of the flower pot 10, along the length of the wire 16, extend upwardly above the extreme upper edge of the rib 11 to provide a protective means against articles, exteriorly of the flower pot, from inadvertently coming into engagement with the flowers or seedlings contained within the pot.

I do not mean to confine myself to the exact details of construction herein disclosed, but claim all variations falling within the purview of the appended claims.

I claim:

1. A collar for a hanging flower pot having a marginal bead about the upper edge thereof comprising an elongated bendable collar member, a loop on one end of said member, a hook on the other end of said member releasably engageable in said loop for releasably engaging said member about said pot below the marginal bead thereof, a plurality of looped bill members including a lower arcuate run engageable over the upper edge of said flower pot for supporting the collar thereon, and a reverted upper run spaced above said lower run, and a plurality of flower pot supporting members engaging said upper run of said bill for hanging the flower pot from a fixed support.

2. A collar for a hanging flower pot having a marginal bead about the upper edge thereof comprising an elongated bendable collar member engageable about the flower pot below the marginal edge thereof, a plurality of looped bill members on said collar member including a lower arcuate run engageable over the upper edge of the flower pot for supporting the collar thereon, and a reverted upper run spaced above said lower run for engagement by pendent flower pot supporting means.

3. A collar for a hanging flower pot having a marginal bead about the upper edge thereof comprising the combination with a flower pot encircling collar engageable below the bead, of hook members carried by said collar engageable over the upper edge of the flower pot for securing said collar thereon, and means carried by said hook members engageable by pendent flower pot supporting means.

4. A collar for a hanging flower pot having a marginal bead about the upper edge thereof comprising the combination with a split flower pot encircling collar engageable below the bead, of releasable fastening means on the opposite ends of said collar for securing said collar encircling said flower pot, hook members carried by said collar engageable over the upper edge of the flower pot for securing said collar thereon, and means carried by said hook members engageable by pendent flower pot supporting means.

ROSIE M. FRACCHIA.

REFERENCES CITED

The following references are of record in the file of this patent:

UNITED STATES PATENTS

| Number | Name | Date |
|---|---|---|
| 353,131 | Greenwood | Nov. 23, 1886 |
| 1,095,504 | Jannock | May 5, 1914 |
| 1,334,199 | Weiseman | Mar. 16, 1920 |